July 20, 1954     E. A. GLYNN     2,683,898
TIRE LOCATING DEVICE FOR RETREADING MOLDS
Original Filed May 13, 1950     2 Sheets-Sheet 1

INVENTOR
Edwin A. Glynn
BY
ATTORNEYS

July 20, 1954     E. A. GLYNN     2,683,898
TIRE LOCATING DEVICE FOR RETREADING MOLDS
Original Filed May 13, 1950     2 Sheets-Sheet 2
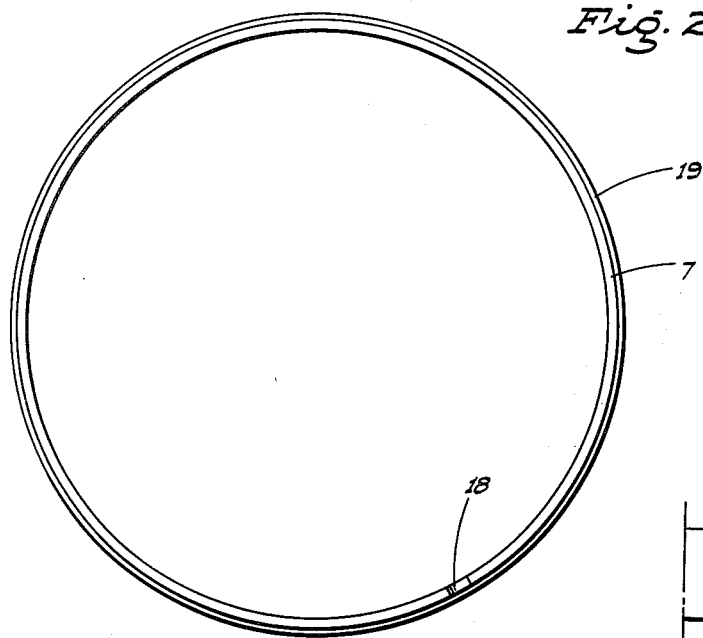
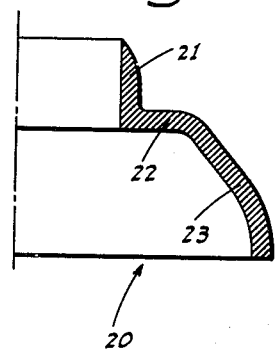
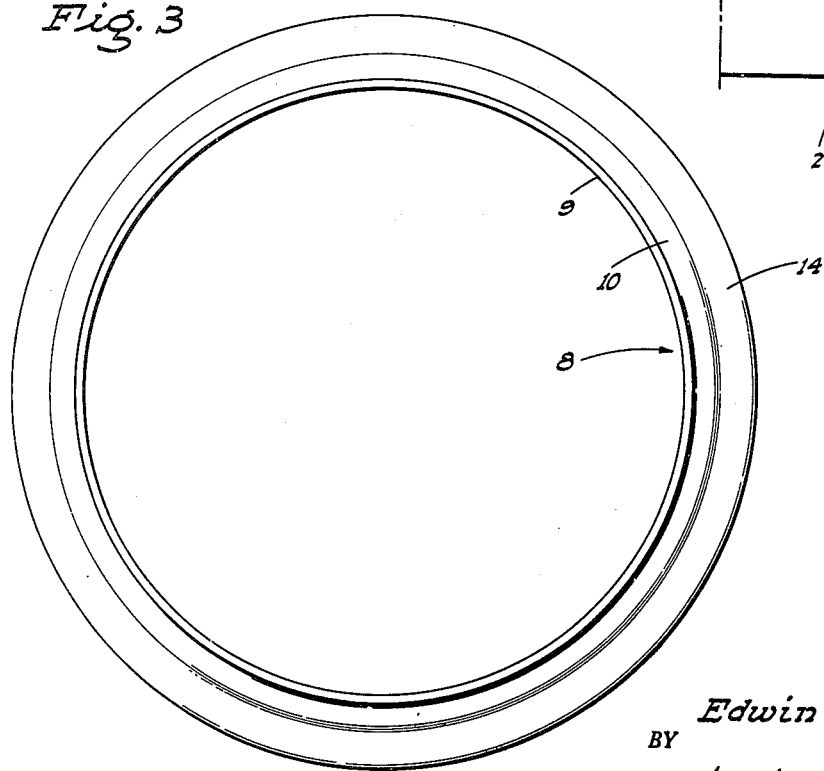
INVENTOR.
Edwin A. Glynn
BY
ATTYS Patented July 20, 1954

2,683,898

UNITED STATES PATENT OFFICE 2,683,898

TIRE LOCATING DEVICE FOR RETREADING MOLDS

Edwin A. Glynn, Lodi, Calif., assignor to Super Mold Corporation of California, Lodi, Calif., a corporation of California Continuation of application Serial No. 161,853, May 13, 1950. This application October 22, 1951, Serial No. 252,469

2 Claims. (Cl. 18—18)

This is a continuation of application for United States Letters Patent, Serial No. 161,853, filed May 13, 1950, now abandoned.

It is a major object of the present invention to provide a novel device adapted to cooperate with a tire retreading mold to effectively and properly locate a tire in said mold for vulcanization of a new tread on the tire.

Another important object of this invention is to provide a device, as above, which acts in cooperation with the beads of a tire to hold the latter straight and true in the mold, and against skewing, to the end that "off-center" treads do not result from the retreading operation.

A further object of the invention is to provide a tire locating device, for a retreading mold, which is initially separate from the mold and readily applied to the tire, but becomes rigid or locked-up relative to the mold upon closing of the latter; the device—when the mold is closed— automatically centering in the mold to properly locate the tire and prevent any misalinement thereof.

An additional object of the invention is to provide a device, as in the preceding paragraphs, which is operative to hold the tire beads in alinement transversely of the mold, i. e. concentric to the mold axis, while at the same time restraining said beads to a position with proper spacing; all to the end that the tire is true in the mold during the period of retread vulcanization. The device is especially designed, but not limited, for use with low pressure type tires which have very flexible side walls and which tires are thus difficult to hold in correct position in a retreading mold.

It is also an object of the invention to provide a tire locator device which is designed for ease and economy of manufacture, and convenience of use.

Still another object of the invention is to provide a practical and reliable tire locator device, and one which will be exceedingly effective for the purpose for which it is designed.

These objects are accomplished by means of such structure and relative arrangement of parts as will fully appear by a perusal of the following specification and claims.

In the drawings:

Fig. 2 is an end elevation, on reduced scale, of the wide faced rim which carries the tire bead engaging ring.

Fig. 3 is an end elevation of one of the tire bead engaging rings.

Fig. 4 is a fragmentary transverse section of a modified tire bead engaging ring.

Figure 1:
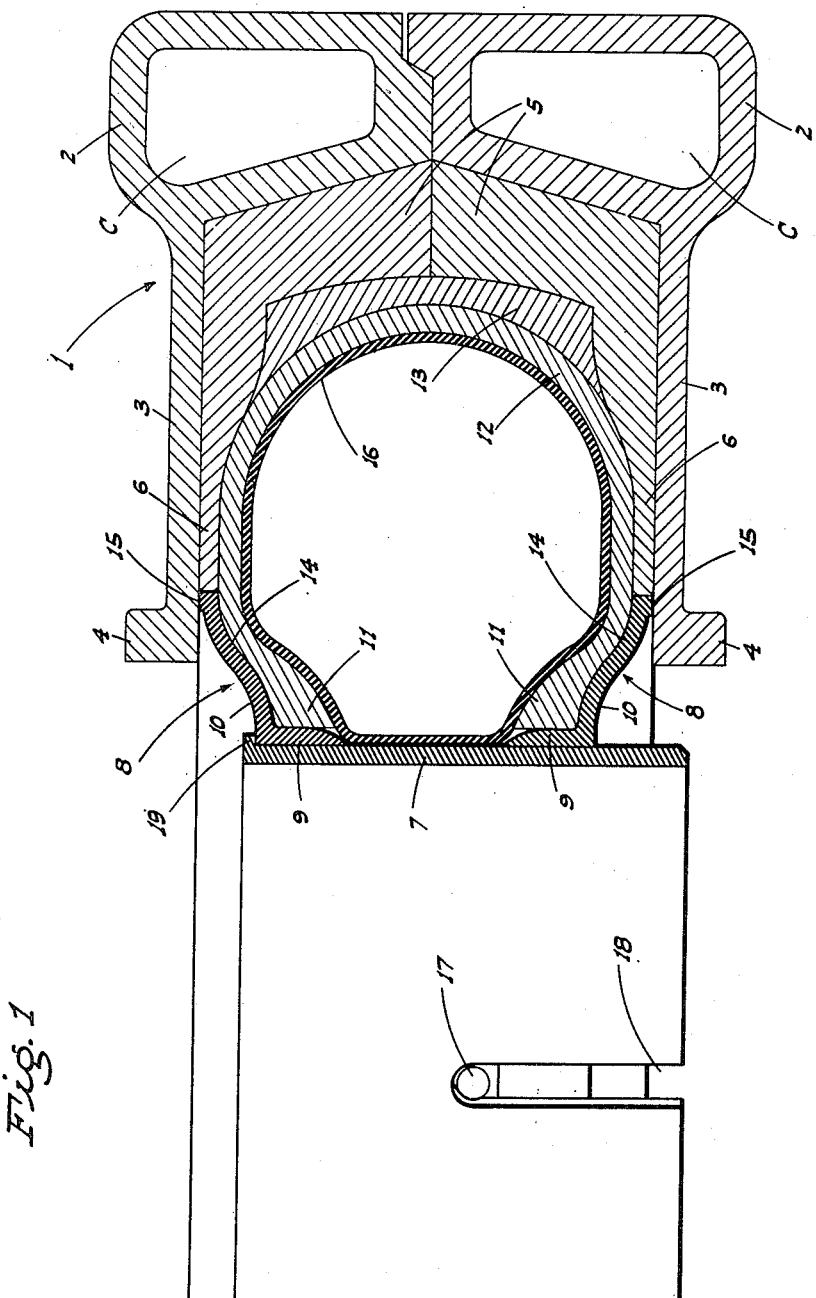
Fig. 1 is a radial section of a retreading mold with the tire locating device cooperating therewith.

Referring now more particularly to the characters of reference on the drawings, and at present to Figs. 1–3, inclusive, the device is adapted for use in a tire retreading mold which includes a mold body, indicated generally at 1, comprised of a pair of cooperating annular mold halves 2 having steam chambers C therein, and mounted— by means not here shown—for powered opening and closing motion.

The annular mold halves 2 each include a radially inwardly extending skirt 3 having a strengthening flange or rib 4 on its inner edge; the mold body 1 confining a matrix comprised of matching matrix halves 5 secured to, and movable with, corresponding body halves 2.

Each matrix half 5 includes a radially inwardly extending skirt 6 which terminates short of the inner edge of the corresponding body skirt 3.

The tire locating device, to which the present invention is directed, comprises a wide flat-faced rim 7 disposed within the confines of the mold body 1; such rim being of considerably smaller diameter than said body and disposed in concentric relation to the same and the matrix therein.

A pair of axially spaced, tire bead engaging rings 8 are mounted on the wide faced rim 7 for relative axial separating motion. Each of the tire bead engaging rings 8 comprises a foot 9 which seats on the rim 7, and a right-angle shoulder 10 which radiates from said rim; said rings 8 receiving the beads 11 of a tire 12, which tire is engaged in the mold body 1 with the new tread material or camelback 13 engaging in the matrix.

In order to assure that the new tread material or camelback 13 be held straight and true in the matrix during the vulcanizing process, and to the end that an off-center tread does not result, it is vital that the tire 12 be properly positioned in the mold with the tire beads 11 exactly concentric to the mold axis properly spaced and held symmetrical to the matrix. This is attained as follows:

Each of the tire bead engaging rings 8 is formed, at the outer edge of the shoulder 10, with an integral locator flange 14 which radiates in outwardly flaring relation to abutment, as at 15, with the adjacent body skirt 3 on the inner face thereof. The locator flanges 14 abut the body skirts 3 substantially in engagement with the inner edges of the matrix skirts 6.

After closing of the mold body 1 with the tire 12 therein, and with the tire locating device on the tire in engagement with the tire beads 11, a tube 16 in said tire is inflated. The tube 16 includes a stem 17 which projects through an open-ended slot 18 in the rim 7.

Upon inflation of the tube 16 the tire beads 11, together with the tire bead engaging rings 8, are forced apart to the extent of their possible separation, which separation is limited by the abutment 15 of the locator flanges 14 with the body skirts 3 as previously described.

The device is thus locked-up or maintained wholly rigid in the mold during the retreading process; the tire bead engaging rings 8, together with the tire beads 11, being held exactly concentric to the matrix and with said tire beads symmetrical thereto. As a result the tire 12 is properly positioned in the mold without possibility of skewing, and the new tread material or camelback 13 is maintained straight and true with respect to the matrix comprised of the matrix halves 5, so that vulcanization of the tread on the tire off-center is prevented.

As the mold is of generally horizontal or laid-down type, the wide faced rim 7 is formed, at its upper edge, with an annular stop bead 19 which prevents downward displacement of said rim through the adjacent ring 8.

A modified type of tire bead engaging ring is illustrated in Fig. 4. Under certain working conditions, and depending on tire type, it is desirable to have the tire beads held closer together. In this instance the tire bead engaging ring 20, as shown in Fig. 4, includes, as before, a foot 21 and a shoulder 22, but the locator flange 23 has a much greater reach axially of the mold. Thus, when rings of this type are used, with the locator flanges 23 abutting the inner face of the body skirts, the rings, and consequently the tire beads, are closer together than in the embodiment of Figs. 1–3.

The described tire locating device, for retreading molds, is especially useful in connection with the retreading of low pressure balloon-type tires which have very flexible sidewalls, and which tires, in the absence of the present device, would be very difficult to hold in alinement in the mold.

The device, while being very practical, effective, and sturdy, is nevertheless simple in structure and economical in manufacture.

The term "retreading" as used herein is to be interpreted as meaning tire tread replacement by top capping, full capping, or full retreading.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. In a full-circle horizontal tire mold which includes a body having separable annular body sections terminating in side skirts which define a central opening, and a matrix in the body terminating within the body short of said opening; a device for centrally locating a tire in the mold comprising a rim of wide flat-faced band form depending through said central opening, a pair of separate spaced rings on the rim, each ring having a tire-bead engaging foot slidably fitting the rim and a locating flange extending radially out from the laterally outer edge of the foot and engaging at its radially outer end with the corresponding termination of the matrix whereby the rings and rim are maintained concentric with the mold and said flange also engaging the adjacent body skirt on the inside upon inflation of the tire; and a stop bead on the upper edge of the rim to limit the downward movement of the rim relative to the adjacent ring; the ring feet being freely and relatively slidable on the rim and removable from the lower end thereof.

2. In a full-circle horizontal tire mold which includes a body having separable annular body sections terminating in side skirts which define a central opening, and a matrix in the body terminating within the body short of said opening; a device for centrally locating a tire in the mold comprising a rim of wide flat-faced band form depending through said central opening, a pair of separate spaced rings on the rim, each ring having a foot slidably fitting the rim on which the adjacent bead of the tire is supported and a locating flange extending radially out from the laterally outer edge of the foot and engaging at its radially outer end with the corresponding termination of the matrix whereby the rings and rim are maintained concentric with the mold and said flange also engaging the adjacent body skirt on the inside upon inflation of the tire, the ring feet being freely and relatively slidable on the rim and removable from one end thereof.

References Cited in the file of this patent

UNITED STATES PATENTS

| Number | Name | Date |
| --- | --- | --- |
| 1,745,145 | Brown | Jan. 28, 1930 |
| 2,418,584 | Hawkinson | Apr. 8, 1947 |
| 2,513,482 | Heintz | July 4, 1950 |

FOREIGN PATENTS

| Number | Country | Date |
| --- | --- | --- |
| 807,624 | France | Oct. 19, 1936 |
| 116,788 | Sweden | July 9, 1946 |